Z. OLSSON.
TIRE FILLING APPARATUS.
APPLICATION FILED JAN. 24, 1921.
Reissued Mar. 15, 1921. 15,065.
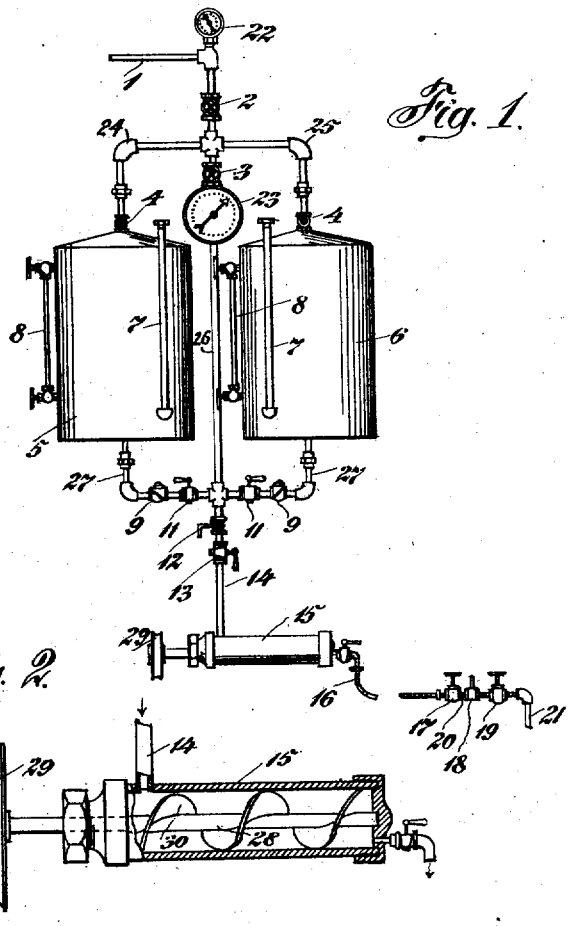
Inventor
Zack Olsson.
By his Attorney
Sigmund Herzog

UNITED STATES PATENT OFFICE.

ZACH OLSSON, OF NEW YORK, N. Y.

TIRE-FILLING APPARATUS.

15,065. Specification of Reissued Letters Patent. Reissued Mar. 15, 1921.

Original No. 1,360,310, dated November 30, 1920, Serial No. 351,970, filed January 16, 1920. Application for reissue filed January 24, 1921. Serial No. 439,695.

*To all whom it may concern:*

Be it known that I, ZACH OLSSON, a citizen of Sweden, and resident of the city of New York, in the county of New York and State of New York, have invented certain new and useful Improvements in Tire-Filling Apparatus, of which the following is a specification.

This invention is a means for replacing the air in a pneumatic tire with a solid chemical compound having resilient properties.

The invention involves primarily, a means for mixing and injecting into an automobile tire a chemical composition which will form a solid resilient material entirely filling the tire, and taking the place of the air which formerly occupied the tire.

A number of processes and mechanisms for accomplishing this general result have heretofore been developed, in one of which is used a main charging vessel provided with an agitator, in which one of the ingredients to be used is contained, and there is also provided an auxiliary charging vessel in which another ingredient for mixing with the first ingredient for forming a resultant resilient material, is contained. The mechanical arrangement is such that the ingredient from the auxiliary charging vessel is injected into the material from the main vessel during the passage of the material to the tire, but is not mechanically and thoroughly intermixed with the material from the main vessel.

None of the processes which have heretofore been used contemplate the necessity of thoroughly intermixing the ingredients from separate tanks and feeding them continuously as the mixing process is carried out into the tires, and it is the particular object of this invention to provide a structure in which two ingredients which rapidly set when brought together, are continuously fed into a mechanical feeder and agitator, and are, by such feeder and agitator fed to the tire simultaneously with the feed of the ingredients to the feeder and agitator. By continuous feed, I have reference to the cycle from the beginning of making the charge, that is, mixing the two ingredients to the end of the charge, that is, when the tire is completely filled.

I have found that by the use of the mechanism which I provide, ingredients may be successfully used in the tire-filling process of such sensitiveness and rapidity of action as could not be successfully used in the mechanisms heretofore used for accomplishing this general purpose.

In carrying my invention into practice, I make use of a pair of tanks for containing the ingredients, which, when mixed, will form the resilient filler for the tire, and provide means whereby the tanks may be subjected to air pressure for forcing the ingredients therefrom. I further provide a mechanical mixer and agitator into which the unmixed ingredients are fed from the tanks and from which the mixed ingredients for forming the filler are injected into the tire, whereby the process of mechanically mixing and agitating the ingredients and forcing the resultant mixture into the tire may be continuously carried out. It is thus seen that I can use sensitive ingredients which necessitates thorough mixture immediately prior to their injection into the tire.

As has been heretofore pointed out, mechanisms accomplishing a mixture of the ingredients before they enter the tire have been used, but such mechanisms do not contemplate the complete intermixture of the ingredients or the use of such sensitive ingredients as I employ in carrying out my method.

In the drawings which form a part of this application, and in which similar characters of reference indicate similar parts throughout the various views:—

Figure 1 represents an elevational view of an apparatus constructed according to my invention, and Fig. 2 represents a longitudinal sectional view taken through the mixer.

Referring more particularly to the drawing, 5 and 6 represent the tanks in which the ingredients to be mixed are contained. Compressed air, or other suitable gas, from a source of supply may be admitted to the tanks through a pipe 1 provided with a pressure gage 22, and with a cut-off valve 2, and through branch pipes 24 and 25, respectively, to the tanks 5 and 6. The pipes 24 and 25 are provided each with a control valve 4 for controlling the supply of compressed air in the tanks. The contents of the tanks, on their way to the mixer, pass through a pipe shown at 14, and this pipe connects with the air-intake pipe 1 by a pipe 26, the latter being provided with a pressure gage 23, and with a valve 3, which valve controls the passage of air through the pipe 26. The valve 3 being closed and the valves 4 opened, air will pass into the tanks 5 and 6, and will be cut off from the pipe 26, and on the other hand, when the valves 4 are closed and the valve 3 is opened, air will be cut off from the tanks, and will pass through the pipe 26.

Each of the tanks is provided with a gage 8 for indicating the level of the contents contained therein, and is also provided with a pipe or corresponding means 7, whereby the tank may be filled.

Each tank communicates with the pipe 14, through the medium of a pipe 27 provided with a check valve 9 therein and also with a cut-off valve 11. The check valves 9 are for the purpose of preventing the ingredients of one tank from flowing to the other, should the heights of the columns of liquids in the tanks be such as would cause the liquid from one tank to flow to the other should the valves 4 and 11 be open. These pipes 27 communicate at a common point with the pipe 14, and a cut-off valve 13 is provided in the pipe 14 below the point of communication of the pipes 27 therewith. A drain cock 12 is provided in the pipe 14 above the cut-off valve 13 through which the contents of the tank may be drained when desired. The lower end of the pipe 14 communicates with one end of a horizontally arranged mixing device indicated generally at 15, which includes a casing having a shaft 28 journaled therein, such shaft being driven through a pulley 29, or by other suitable means. A spiral blade 30 is carried on the shaft 28, and serves as a means of mixing the ingredients fed to the mixer from the tanks, and of simultaneously forcing the resultant mixture through a flexible tube or other suitable piping indicated at 16, to the tire which is to be filled.

The tubing 16 is provided with a cut-off valve 17 therein, and with an air-cock 18, beyond the cut-off valve from the mixer, which air-cock may be attached to a pump (not shown) for exhausting the air from the tube or tire, prior to filling the same with the mixture, as will be hereinafter pointed out. A coupling 20 is arranged in the tubing 16 between the air-cock 18 and the cut-off valve 17.

A globe valve 19 is arranged in the tube at a point beyond the air-cock 18, and the tube terminates at 21 in a cap which may be attached to the valve stem of the tire in the usual manner, for establishing communication through the valve stem with the tube 16.

The operation of the apparatus may be briefly described as follows:

All of the valves being closed, the cap 21 is connected with the valve stem of the tire to be filled, the valve 19 opened, and the air-cock 18 is connected to the vacuum pump (not shown). The air is then exhausted from the tube, and the valve 19 is closed and the air-cock 18 disconnected from the pump. Preferably a rubber connection, or other easily removable flexible connection is made between the air-cock and the pump. At any rate, such connection is made that this valve may be disconnected from the pump and left open to the atmosphere after the air has been exhausted from the tire. The valve 17 is then opened, and the cut-off valves 11 in the respective pipes 27 are opened in proportion to the amount of the ingredients to be fed from the tanks 5 and 6. The valves 4 are then opened. The valve 2 is then opened and so regulated that the air pressure is allowed to enter slowly at first, and at the same time the mixer is started up and the valve 13 is opened. As soon as the air is driven out of the pipe line 14 and the mixer, which will be indicated by the fact that the air no longer passes out of the air-cock 18, this air-cock is closed and the valve 19 opened. The ingredients flowing from the chambers 5 and 6 through the pipes 27 and 14 into the mixer, are therein thoroughly intermixed and commingled, and in this mixed state are forced through the flexible tube 16 into the inner tube, filling up the latter. The resistance pressure attained in the tube will be registered by the gage 23, and when the desired pressure is reached the valves 19, 17, 11 and 2 are closed.

The tube 16 is then disconnected at the coupling 20, and the valves 3 and 17 are opened. This allows the excess air pressure from the tanks 5 and 6 to enter the tube 26 at the top of the latter, and drive out all of the compound left in the pipe, the mixer and the tubing 16 before it has time to harden, thereby saving considerable time and avoiding trouble and loss of material.

The portion of the pipe, beyond the coupling 20, including the valves 18 and 19 and the cap 21, may be cleaned by disconnecting the cap 21 from the tube and by driving air from the vacuum pump through this section of the tube.

From the foregoing description it will be seen that I have provided an apparatus by which the use of materials of a super-sensitive nature, that is, which will rapidly set and harden when brought together, may be mechanically mixed and injected into a tire.

Having thus described my invention, what I claim and desire to secure by Letters Patent is,—

1. In a tire filling apparatus the combination of a plurality of tanks for containing ingredients, which, when mixed, will form a resilient compound for filling a tire, means for admitting a gas under pressure to the tanks, means for controlling the admission of the gas to the tanks, a mechanical mixer, means for providing a communication from the tanks to the mixer, means for controlling such communication, means for effecting a communication between the mixer and the tire to be filled, and means for controlling the last said means.

2. In a tire filling apparatus the combination of a plurality of tanks for containing ingredients, which, when mixed, will form a resilient compound for filling a tire, means for admitting a gas under pressure to the tanks, means for controlling the admission of the gas to the tanks, a mechanical mixer, means for providing a communication from the tanks to the mixer, means for controlling such communication, means for effecting a communication between the mixer and the tire to be filled, and means for controlling the last said means, including a means for exhausting air from the tire.

3. A tire filling mechanism, including a mechanical mixer, a pipe for establishing communication between the mixer and a tire to be filled, an air-cock in said pipe for connection with a means for exhausting the air from the tire, a cut-off valve between the air-cock and the mechanical mixer, whereby communication between the air-cock and the mixer may be cut off during the period of exhaustion of air from the tire, and a valve for controlling the communication between the air-cock and the tire.

4. In a tire filling mechanism the combination with a plurality of tanks for containing ingredients, which, when mixed, will form a solid resilient filler for a tire, of means for admitting gas under pressure to the tanks, means for forming a communication between the tanks and the tire to be filled and a mechanical mixer arranged in the last communication means for the purpose of mechanically mixing the ingredients immediately prior to their injection into the tire.

5. In a tire filling mechanism the combination with a plurality of tanks for containing ingredients, which, when mixed, will form a solid resilient filler for a tire, means for admitting a gas under pressure to the tanks, a means of communication between the tanks and the tire to be filled, and a means arranged in the means of communication for mechanically intermixing the ingredients from the tanks and for forcing such ingredients when mixed into the tire.

6. In a tire filling mechanism, the combination with a plurality of tanks for containing ingredients, which, when mixed, form a solid resilient filler for a tire, of a mechanical mixer receiving the ingredients from said tanks and forcing the same when mixed into the tire.

7. In a tire filling mechanism, the combination with a plurality of tanks for containing ingredients, which, when mixed, form a solid resilient filler for a tire, of means interposed between said tanks and the tire for mechanically mixing the ingredients immediately prior to their injection into the tire and forcing such ingredients when mixed into the tire.

8. A tire filling mechanism according to claim 7, comprising means for controlling the communication between each tank and said mixing means.

9. A tire filling mechanism according to claim 6, comprising means for preventing a flow of the ingredients from any one of said tanks to the other tanks.

10. A tire filling mechanism according to claim 7, comprising means for preventing a flow of the ingredients from any one of said tanks to the other tanks.

11. A tire filling mechanism according to claim 6, comprising means for varying the proportion of the ingredients flowing to said mixing means.

12. A tire filling mechanism according to claim 7, comprising means for varying the proportion of the ingredients flowing to said mixing means.

13. A tire filling mechanism according to claim 6, comprising means for controlling the communication between said tanks and said mixing means, and means for varying the proportion of the ingredients flowing to said mixing means.

14. A tire filling mechanism according to claim 7, comprising means for controlling the communication between said tanks and said mixing means, and means for varying the proportion of the ingredients flowing to said mixing means.

15. A tire filling mechanism according to claim 6, comprising means for controlling the communication between said mixing means and the tire.

16. A tire filler mechanism according to claim 7, comprising means for controlling the communication between said mixing means and the tire.

Signed at New York, in the county of New York and State of New York, this 21st day of December, 1920.

ZACH OLSSON.